June 15, 1926.

H. R. MOULTON 1,588,768

PROCESS FOR PRODUCING OPHTHALMIC LENSES

Filed March 11, 1925

Inventor
Harold R. Moulton.
By Harry H. Styll
Attorney

Patented June 15, 1926.

1,588,768

UNITED STATES PATENT OFFICE.

HAROLD R. MOULTON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PROCESS FOR PRODUCING OPHTHALMIC LENSES.

Application filed March 11, 1925. Serial No. 14,724.

This invention relates to the art of producing lenses, and has particular reference to the provision of an improved process for producing ophthalmic lenses by blast abrading.

An important object of the invention is to provide an improved process for producing ophthalmic lenses more rapidly and more economically than has been possible in the past without the use of grinding tools.

Another object is to provide such a process which will not require specially shaped surfacing tools for its exploitation.

Another object is to provide such a process which will be especially adaptable for the production of aspherical or irregular curved surfaces.

Another object is to provide such a process which will be equally adaptable for rough surfacing and polishing of lenses.

With these and other objects in view the invention resides in the novel features of construction and steps of the process as hereinafter set forth, illustrated in the accompanying drawings, and specifically pointed out in the appended claims.

In the accompanying drawings, wherein similar reference characters designate corresponding parts throughout the several views.

Figure 1:
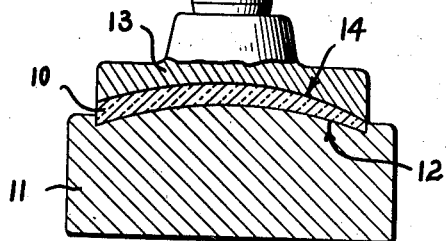
Figure 1 is an elevation of a piece of glass stock from which a lens is to be produced.
Figure 2:
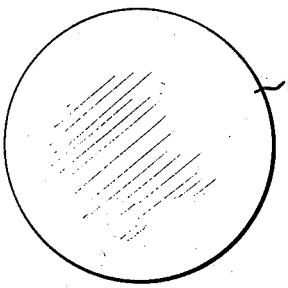
Figure 2 is a top plan view thereof.

In carrying out the invention, a piece of optical glass 10 is provided of the approximate outline desired and preferably with smooth surfaces, said piece of glass being entirely free from striæ, internal bubbles, etc., which would be objectionable in a lens. The blank is then softened as by heating until it becomes substantially plastic, whereupon it is dropped into a mold member 11 having an operative surface 12, which surface is of the exact curvature it is desired to impart to the lens blank. A die plunger 13 is then brought down against the outer surface of the blank 10 so as to depress the same in the mold and form the upper surface 14 of the blank also to exact curvature desired. In this manner the surfaces 12 and 14 have been formed into the exact shapes desired and it is to be noted that the process covered by this invention may be used for any type of lens, that is, spherical, cylindrical, toric, or an irregular aspherical curve.

For carrying out the surfacing operations, I provide a device having an enclosed chamber, designated generally by the character 15, in which is mounted a spindle 16, upon which the lens blank 10 is adapted to be mounted after it has been formed to the proper shape. The spindle 16 may be stationary or it may be capable of rotation through the instrumentality of a pulley 17 connected to a suitable source of power. Opposed to the spindle 16 is an abrasive ejecting head or nozzle 18, which is supplied with compressed air through the pipe 19, and with abrasive material such as sand through the pipe 20.

Figure 4:
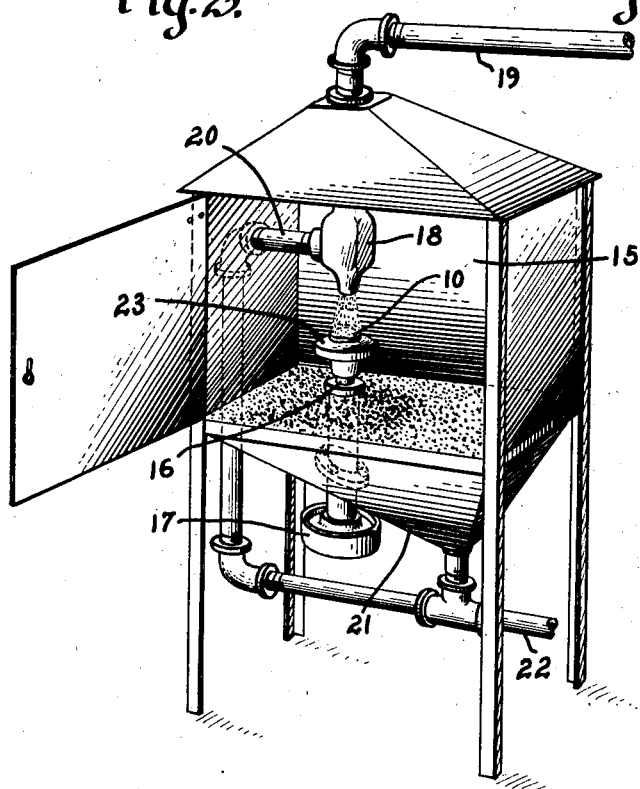
Figure 4 is a diagrammatic view showing the finishing of the lens surface after molding.

As illustrated in Figure 4 of the drawings, the bottom of the chamber 15 may be formed as a hopper 21, whereby the used abrasive material may be collected and returned to the pipe 20 by compressed air in a pipe 22.

Figure 3:
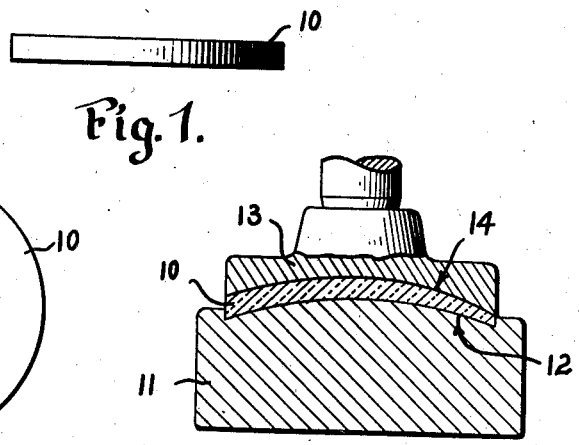
Figure 3 is a sectional view through a pair of molding dies, wherein the lens blank is formed to the proper surface shape.

After the lens has been formed to shape, as described in connection with Figure 3, it is mounted upon a suitable holder or block 23, which may be supported upon the upper extremity of the spindle 16. When it is thus mounted a blast of fluid abrasive is impelled against the exposed surface of the lens blank. Obviously there are several different materials which may be used for this finishing operation. I have found that a fine grade of sand is very desirable for the roughing operations, which may be termed equivalent to the rough grinding in the prior art as the lens so treated will have a ground glass appearance but will be true to shape, after which I may use a mixture of moistened rouge and fine sawdust for the purpose of polishing the surface to a clear polished lens surface, the moistened rouge and sawdust being sprayed or blasted on exactly like the sand in the rough blasting operations.

After the first surface has thus been finished it may be mounted on another holder so as to expose the opposite side of the blank to the action of the blasting operations, or the second side may be finished in any other manner desired, such as on an ordinary grinding and polishing machine.

The molded surfaces of the blank will be true to the desired curve but slightly rough, as is usual with molded glass surfaces, but being made from smooth or polished glass the surfaces will be very even without noticeable depressions and raised portions. The rough blasting operations with sand will smooth the blank but not alter its shape but it will be translucent like ground glass. The polishing blast with rouge and sawdust will smooth and polish the blank to a clear transparent lens surface without altering its shape; hence the lens will be finished to the required curvature with a high lens polish clear and serviceable for refracting purposes. In this way lens surfaces of a shape that cannot be made by grinding can be formed in a simple, inexpensive way.

From the foregoing it will be obvious that I have produced an improved process for surfacing lenses, and that said process will be very economical in commercial application, and readily adaptable for any type of a lens.

Obviously changes may be resorted to in the details and in the arrangement of the steps of the process, and the right is herein reserved to make such changes falling within the scope of the appended claims without departing from the spirit of the invention.

Having thus described my invention, I claim:

1. A process for producing an ophthalmic lens which consists in molding a lens blank to desired surface shape, and finishing the surface by spraying an abrasive fluid thereagainst.

2. A process for rough surfacing an ophthalmic lens blank which consists in molding a lens blank to desired shape and thereafter spraying the blank with sand.

3. A process for producing an ophthalmic lens which consists in molding a lens blank to desired shape, and thereafter abrading the surface of the blank by rotating it in the path of a spray of abrasive fluid.

4. A process for producing an ophthalmic lens which consists in providing a glass disc, heating the disc to plasticity, forming the desired surface shape while in plastic condition, and abrading the surface by action of a spray of abrasive fluid.

5. A process for producing an ophthalmic lens which consists in providing a glass blank, heating the blank to plasticity, forming a surface of desired shape on the blank while in plastic condition, rotating the blank, and subjecting the surface of the blank to a sand blast while rotating.

6. A process for making an ophthalmic lens consisting in molding a glass blank having polished surfaces to the required curvature, roughing the formed blank with a sand blast, and polishing the roughed surface to a finished lens surface with a spray of rouge.

7. A process for making an ophthalmic lens consisting in molding a piece of glass with polished surfaces to the required curvature, treating the molded blank to a sand blast, and then treating the blasted blank to a blast of mixed rouge and sawdust to produce a polished lens surface thereon.

8. A process for making an ophthalmic lens consisting in molding a piece of glass having polished surfaces to the required curvature, sandblasting the molded blank, and then blasting the blank with a blast of polishing material.

HAROLD R. MOULTON.